US012623977B2

(12) United States Patent
Franzrahe

(10) Patent No.: US 12,623,977 B2
(45) Date of Patent: May 12, 2026

(54) METHOD FOR PRODUCING A FERTILIZER

(71) Applicants: thyssenkrupp Fertilizer Technology GmbH, Dortmund (DE); thyssenkrupp AG, Essen (DE)

(72) Inventor: Harald Franzrahe, Dortmund (DE)

(73) Assignees: thyssenkrupp Fertilizer Technology GmbH, Dortmund (DE); thyssenkrupp AG, Essen (DE)

( * ) Notice: Subject to any disclaimer, the term of this patent is extended or adjusted under 35 U.S.C. 154(b) by 950 days.

(21) Appl. No.: 17/791,816

(22) PCT Filed: Dec. 21, 2020

(86) PCT No.: PCT/EP2020/087545
§ 371 (c)(1),
(2) Date: Jul. 8, 2022

(87) PCT Pub. No.: WO2021/140024
PCT Pub. Date: Jul. 15, 2021

(65) Prior Publication Data
US 2023/0035921 A1      Feb. 2, 2023

(30) Foreign Application Priority Data

Jan. 8, 2020    (EP) .................................... 20150740

(51) Int. Cl.
C05C 9/00        (2006.01)
B01J 35/39       (2024.01)
C05G 5/12        (2020.01)

(52) U.S. Cl.
CPC .............. C05C 9/005 (2013.01); B01J 35/39 (2024.01); C05G 5/12 (2020.02)

(58) Field of Classification Search
CPC ..... C07C 273/00; C07C 273/14; C05C 9/005; C05C 1/00; C05C 3/005; C05G 5/12; B01J 35/39
See application file for complete search history.

(56) References Cited

U.S. PATENT DOCUMENTS 3,232,984 A    2/1966  Finneran
4,416,748 A    11/1983  Stevens
(Continued)

FOREIGN PATENT DOCUMENTS

CN    101006011 A    7/2007
CN    106946590 A    7/2017
(Continued)

OTHER PUBLICATIONS

"Urea." Inorganic Chemistry Industry Emission Factors, Chapter 8.2, EPA.gov (Year: 1995).*
(Continued)

*Primary Examiner* — Amber R Orlando
*Assistant Examiner* — Heather Elise Rainbow
(74) *Attorney, Agent, or Firm* — thyssenkrupp North America, LLC

(57)        ABSTRACT

A method for producing a fertilizer that comprises urea and/or at least one ammonium compound may involve obtaining ammonia as an impurity in the production process, and photocatalytically decomposing the ammonia by irradiation with UV radiation. Further, an apparatus for producing fertilizer granules that comprise urea and/or at least one ammonium compound may include a plant section having a fertilizer granulator configured to produce the fertilizer granules, a supply line configured to pass a urea melt or a concentrated urea solution to the plant section, a UV lamp arrangement that is proximate the supply line and is con- (Continued)

figured to irradiate with UV radiation the urea melt or the concentrated urea solution flowing in the supply line.

10 Claims, 2 Drawing Sheets

(56)                 References Cited

U.S. PATENT DOCUMENTS

| | | | |
|---|---|---|---|
| 5,240,490 | A | 8/1993 | Moore |
| 6,084,129 | A | 7/2000 | Romiti |
| 6,203,730 | B1 | 3/2001 | Honda et al. |
| 6,770,174 | B1 | 8/2004 | Richards et al. |
| 7,198,698 | B1 | 4/2007 | Richards et al. |
| 7,498,009 | B2 | 3/2009 | Leach et al. |
| 8,466,315 | B2 | 6/2013 | Niehues et al. |
| 9,440,889 | B2 | 9/2016 | Ingels |
| 2008/0092614 | A1 | 4/2008 | Ingels et al. |
| 2008/0116054 | A1* | 5/2008 | Leach .................... B01D 53/72 |
| | | | 204/157.3 |
| 2011/0229394 | A1 | 9/2011 | Niehues et al. |
| 2013/0319060 | A1 | 12/2013 | Niehues et al. |
| 2015/0133689 | A1* | 5/2015 | Potthoff ................... B01D 1/00 |
| | | | 422/187 |

FOREIGN PATENT DOCUMENTS

| | | | |
|---|---|---|---|
| CN | 108911798 | A | 11/2018 |
| CN | 109894003 | A | 6/2019 |
| EP | 0 900 589 | A1 | 3/1999 |
| EP | 2 362 863 | B1 | 9/2011 |
| EP | 2 616 412 | A1 | 7/2013 |
| GB | 959358 | A | 6/1964 |
| JP | S47-004971 | B | 8/1968 |
| JP | S47-029161 | A | 11/1972 |
| JP | H0275326 | A | 3/1990 |
| JP | H11-090463 | A | 4/1999 |
| JP | H 11244830 | A | 9/1999 |
| JP | 2011-019647 | A | 2/2011 |
| JP | 2015-522503 | A | 8/2015 |
| TW | 201112944 | A | 4/2011 |
| WO | 2010/060535 | A1 | 6/2010 |
| WO | 2013/085395 | A1 | 6/2013 |

OTHER PUBLICATIONS

"Effects of ultraviolet-enhanced ozonation on the degradation of ammonia and urea in fertilizer plant wastewater." Yusuf et al. IOP Conference Series: Materials Science and Engineering. vol. 536. No. 1. IOP Publishing. (Year: 2019).*

English Translation of International Search Report Issued in PCT/EP2020/087545 dated Apr. 8, 2021.

Suto, Masako, et al., "Photodissociation of NH3 at 106-200 nm", J. Chem. Phys., 78(7): 4525-4522, Apr. 1, 1983.

Quinton, Alan M., et al., "Vacuum Ultraviolet Photodissociation of Ammonia", J. Chem. Soc., Faraday Trans. 2, 78:1261-1269, 1982.

Bergese, J., "Kinetics and Benefits of Employing UV Light for the Treatment of Aqueous Ammonia in Wastewater", Degree for Master of Applied Science, Dalhousie University, Halifax, Nova Scotia, 162 pages, Aug. 2013.

Du, J., et al., "The influence of water vapor absorption in the 290-350 nm region on solar radiance: Laboratory studies and model simulation", Geophysical Research Letters, 40: 4788-4792 (2013).

* cited by examiner

METHOD FOR PRODUCING A FERTILIZER

CROSS REFERENCE TO RELATED APPLICATIONS

This application is a U.S. National Stage Entry of International Patent Application Serial Number PCT/EP2020/087545, filed Dec. 21, 2020, which claims priority to European Patent Application No. EP 20 150 740.7, filed Jan. 8, 2020, the entire contents of both of which are incorporated herein by reference.

FIELD

The present disclosure generally relates fertilizers, including methods for producing a fertilizer that comprises urea and/or an ammonium compound, where ammonia is obtained as an impurity in the production process.

BACKGROUND

In view of global population growth, the development of flexible and efficient fertilizers is of major and growing significance. What is important here is not just the fertilizer itself, i.e., the chemical composition, but also the processing forms in transportable containers and the application to the land. Of greatest significance here is certainly granulation to form regular particles which are the same in size and characteristics. Important parameters in this context are low dusting, strength, low aggregation tendency, uniform size, storability, and stability. One established granulation technique is fluidized bed granulation, which exhibits improved particle properties compared, for example, to the prilling and pelletizing techniques.

Virtually all fertilizers require ammonia in some form in their production. Urea is the diamide of carbonic acid and is produced industrially in a high-pressure process from ammonia and carbon dioxide. Other fertilizers are mixtures of ammonia and nitrates or combinations of ammonia-containing compounds, ammonia salts for example, phosphorus and potassium.

A very large share of worldwide fertilizer production is accounted for by urea-containing fertilizers. This water-soluble fertilizer breaks down in the soil to give ammonium salts and/or nitrates, and is an important base fertilizer. This urea-containing fertilizer can be combined with further elements such as potassium, phosphates or sulfur compounds.

All of the aforesaid processes for producing fertilizers require ammonia in some form, particularly when solid fertilizer granules are being produced. Ammonia may be released during the production process. With some methods, especially in the production of urea-containing granules, ammonia is absorbed physically in the melt or is formed by polymerization reactions—for example, by the formation of biuret in accordance with the following equation:

$$2NH_2\text{—}CO\text{—}NH_2 \rightarrow H_2N\text{—}CO\text{—}NH\text{—}CO\text{—}NH_2 \text{ (biuret)} + NH_3 \quad (1)$$

Many methods for producing fertilizer granules use large airflows, an example being fluidized bed granulation. If the ammonia enters the airflow, it must be removed, in order to satisfy the present protocols relating to emissions from plants producing large quantities of inorganic compounds.

As a raw material, in granulation, particularly in the fluidized bed granulation of fertilizers, a concentrated urea solution is required. This solution generally contains a dissolved ammonia fraction, more particularly of the order of about 500 ppm to 800 ppm. During granulation, this ammonia is released and enters the granulator offgas. In order to comply with ammonia emission limits, therefore, an ammonia offgas scrubber has to be used. This is very complicated in terms of apparatus and energy-consuming and produces an aqueous solution of an ammonia salt. This solution must either be disposed of or processed. In certain cases (in the case of nitrate fertilizers, for example), the ammonium salts obtained from offgas scrubbing can be returned to the process. In the production of urea-containing fertilizer granules, however, this possibility is absent or very limited (see EP 2 362 863 B1). If the fraction of ammonium salts in the product is increased, this leads to unwanted product properties in urea-containing fertilizer granules, for example to an increased hygroscopicity (see EP 2 616 412 B2).

A further disadvantage is that the offgas scrubbers lead to a pressure loss and therefore sizeable fans are needed for the plant, which have a relatively high power consumption. The capital costs and the operating costs of a plant for producing fertilizer granules increase accordingly. Methods for reducing the ammonia emissions of a urea granulation plant, where the ammonia is absorbed in an acidic scrubbing solution and is reacted to form ammonium sulfate, are described in WO 2010/060535 A1, for example.

Other approaches employed in the prior art provide for ammonia removal by stripping with carbon dioxide (see U.S. Pat. No. 6,084,129 A).

A method and an apparatus for granulating urea in a fluidized bed granulator are known from EP 0 900 589 B1, for example. With this method, seeds of urea particles are introduced into a granulator, and these seeds are sprayed via nozzles with a concentrated aqueous urea solution. The granulator has a base plate with a multiplicity of apertures through which fluidizing air is blown in from below, causing the particles to be maintained in a fluidized state in the reactor space of the granulator. The spray application of the concentrated urea solution causes the seeds to grow into granular particles having a desired particle size, which are discharged from the reactor space of the granulator.

U.S. Pat. No. 4,416,748 A discloses a method for reducing NOx in flue gases, wherein the gas to be purified is mixed with ammonia and the mixture is irradiated with UV light. Photolysis of the ammonia here generates amino radicals ($NH_2$), which react with NOx, and so inert nitrogen gas and $N_2O$ are formed. In this case a UV lamp is mounted externally on a flue gas duct, this duct having a quartz window transmissive for ultraviolet radiation. There is no reference at all in this document to methods for producing fertilizers based on urea or on other substances which can be prepared from ammonia.

Thus a need exists for a method for producing a fertilizer having the features stated above, wherein the ammonia emissions are reduced, without any need for substantial modification of the production process itself.

BRIEF DESCRIPTION OF THE FIGURES

The present disclosure is described in more detail below in connection with the figures, which are not to scale and do not limit the present disclosure.

DETAILED DESCRIPTION

Figure 1:
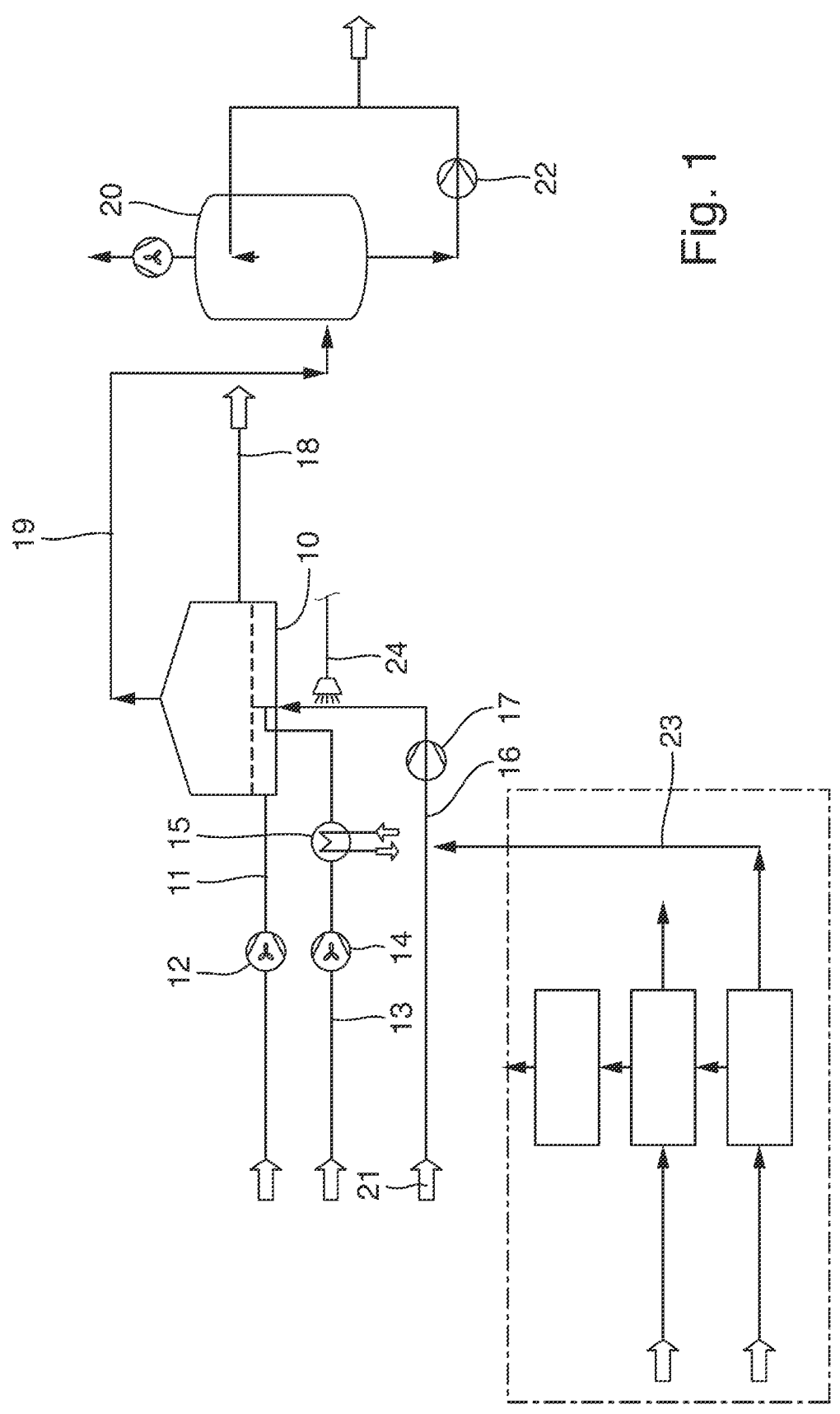
FIG. 1 is a simplified schematic representation of an example method for granulating fertilizer granules, more particularly urea-containing fertilizer granules.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to one preferred development of the present invention, fertilizer granules are produced in a granulation process. As already mentioned above, in comparison to prills or pellets, fertilizer granulates have a number of advantageous particle properties, this being the reason for the preference for production of fertilizer granules in the context of the method of the invention.

The present invention preferably relates to a granulation process which produces urea-containing fertilizer granules. "Urea-containing" in this context means that the fertilizer granules contain urea and may additionally contain other active fertilizer components (formaldehyde or sulfur, for example) and also suitable additives, used for example for improving the granule properties, targeted release of the fertilizer components, etc.

With particular preference, in accordance with the present invention, the urea-containing fertilizer granules are produced by fluidized bed granulation. Fluidized bed granulation is an advantageous, known method for producing fertilizer granules, and is elucidated in more detail later on below.

The method of the invention provides for photocatalytic decomposition of the ammonia by irradiation with UV radiation. As a result of the photocatalysis, the ammonia molecules are destroyed and the resultant decomposition products, particularly nitrogen and water, possibly nitrite ions and nitrate ions, are not environmentally harmful and can be emitted to the atmosphere without concern together with the plant offgas, or disposed of via waste water streams. A number of assumed mechanisms of the photocatalytic decomposition reaction of ammonia by UV radiation are indicated later on below.

The term "ammonia" is understood for the purposes of the present invention to refer both to gaseous ammonia and dissolved ammonia ($NH_3$), and to ammonia present in the form of ammonium ions ($NH_4^+$). In aqueous solution there is a pH-dependent and temperature-dependent equilibrium in accordance with the following equation:

$$NH_3 + H_2O \leftrightarrow NH_4^+ OH^- \qquad (2)$$

Above a pH of 9.25, $NH_3$ is the dominant form in the equilibrium, whereas at pH levels below 9.25 the ammonium ion $NH_4^+$ is the dominant form of the total ammonia. Both species present in the equilibrium according to the equation above are embraced for simplification by the term "ammonia" in accordance with the invention.

Since the ammonia, to a decidedly predominant extent, is not formed in the granulation process, but instead enters the process by way of the concentrated urea solution used as a raw material, which contains dissolved ammonia, the approach according to the invention provides for removal of the ammonia component prior to the granulation.

An advantage of the solution provided by the invention is that the ammonia offgas scrubber otherwise needed in the known methods, along with its accessory devices, which to date have occupied a not inconsiderable space, can now, if desired, be omitted. A further advantage is that old, existing plants, hitherto operated without ammonia offgas purification, can be retrofitted comparatively easily with the devices of the invention for the photocatalytic destruction of the ammonia.

In contrast to the case with flue gas denitrification plants (see, for example, abovementioned U.S. Pat. No. 4,416,748 A), where nitrogen oxides can be reacted with ammonia to form nitrogen and steam, the offgas from a fertilizer granule production plant is not hot, but has a relatively high water content. The outgoing air stream is saturated. As a result of the high water content, subjecting an offgas stream from such a plant to photocatalysis will not work. Since the air flowing out of the granulator also has a high dust content, the dusts would absorb/scatter the radiation from any UV lamp used and reduce the efficiency and lifetime of the UV lamp. To remove the dusts, modern fertilizer production plants use dust scrubbers. There are also plants which employ additional mechanical apparatus for dust removal, such as cyclones or filter apparatus, for example, in order to remove larger quantities of dust. In order to achieve the emissions limits, however, these plants have to employ secondary wet scrubbers in the dust section in order to remove fine dust particles and aerosols.

It would be possible in principle to use a UV lamp in such a plant, in the dust section between the dust removal device and the wet scrubber. However, the siting of a photocatalytic UV unit downstream of a wet scrubber is not possible, owing to overlap between the absorption frequencies of the water molecule and the ammonia molecule. The water would therefore substantially reduce the efficiency of photocatalytic decomposition of the ammonia.

The air lines leading to the scrubbers are comparatively large in diameter, and the use of a photocatalytic UV unit in this region would necessitate a considerable number of expensive UV lamps.

A better technique, enabling a more compact construction, is therefore the approach envisaged in one preferred development of the invention, whereby a photocatalytic UV system is arranged in a region which lies on the conveying path to the fluidized bed granulator in which the fertilizer particles are produced.

For producing urea granules it is necessary to have a urea melt or a concentrated urea solution. At a melt temperature lying approximately in the range from 130° C. to 140° C., the urea melt absorbs the ammonia physically. With known processes for producing urea granules, the concentration of the ammonia in the melt may be, for example, roughly in the range of 500 ppm and about 800 ppm. Given the decidedly low solubility of the ammonia in solid urea, which is of the order, for example, of about 50 ppm, a considerable amount of ammonia is released during the solidification of the urea, and passes from the solids unit into the offgas. Moreover, urea undergoes dimerization to form biuret (see reaction equation (1) above), a substance which is unwanted in this production process. This reaction releases additional ammonia. If attempts are made to reduce the ammonia concentration in a urea solution or melt, it must be ensured that the formation of biuret is not promoted by a shift in the reaction equilibrium in favor of biuret, owing to the removal of ammonia. The applicant, conversely, is not aware that the use of UV radiation in the method of the invention promotes the polymerization of urea.

According to one development of the method, ammonia bound or dissolved in a urea melt or in a concentrated urea solution is preferably destroyed photocatalytically.

Alternatively or additionally to this, according to one possible variant of the invention, ammonia contained in an offgas stream may be destroyed photocatalytically.

It is, though, particularly advantageous, according to one development of the method, if a urea melt or concentrated urea solution is irradiated with UV radiation on the transport pathway to a fertilizer granulator. As the ammonia is present dissolved in the urea melt or concentrated urea solution, it is advantageous for the ammonia to be decomposed before the urea melt enters the granulator. Otherwise, owing to the elevated temperatures prevailing in the granulator, the ammonia there would outgas from the melt and therefore pass into the granulator offgas. As already observed above, it is more difficult to decompose the ammonia in an offgas stream from the granulation, as this offgas stream contains dusts and water. With particular preference, therefore, the UV irradiation takes place in the region of a supply line for urea melt or concentrated urea solution upstream of the fertilizer granulator.

According to one preferred development of the present invention, in particular, the urea melt or concentrated urea solution is irradiated with UV radiation at a low spatial and/or temporal distance or immediately before addition to the fertilizer granulator. The one or more lines used for supplying the urea melt or concentrated urea solution to the fertilizer granulator generally have a cross section which is not particularly large, its sizing being such that irradiation with UV radiation can be performed possibly with only one UV lamp or at any rate with only a few UV lamps, this irradiation acting on the entire cross section of the line. This enables the establishment of a UV lamp arrangement which is cost-effective and requires relatively little complexity of apparatus.

UV radiation is understood generally as the radiation range wherein wavelengths are shorter than those of visible light. UV radiation overall embraces the wavelength range from 380 nm to 100 nm. In the context of the method of the invention, it is possible to use UV radiation having wavelengths in the range from 170 nm to 350 nm. Preferred, however, is the use of UV radiation having wavelengths which are lower than the range in which water absorbs UV radiation, namely below 290 nm, since water absorbs in the near UV range of 290 to 350 nm. UV radiation is preferably used in a wavelength range in which the ammonia molecule strongly absorbs UV radiation. This is the case in particular in the range from 170 nm to 315 nm, with the UV absorption of $NH_3$ showing a maximum roughly between 190 nm and 195 nm. For example, UV radiation whose wavelength is in the range from 185 nm to 254 nm, is used. UV lamps suitable for the method of the invention and available on the market emit, for example, largely monochromatic UV radiation in the UV-C range at about 254 nm or about 185 nm.

It is preferred in the context of the method of the invention if the ammonia is decomposed photocatalytically by means of UV radiation at least predominantly to give nitrogen and water. On irradiation of ammonia with UV light, the $NH_3$ molecule undergoes decomposition by elimination of a H radical into $NH_2$ radicals (amino radicals).

In the presence of water molecules, on irradiation with UV light having a wavelength of 253.7 nm, for example, the initial products, by dissociation, are hydrogen atoms and OH radicals ($OH\cdot$). Ammonia molecules can react with the OH radicals according to one of the mechanisms reproduced below:

$$NH_3+OH\cdot \rightarrow NH_2+H_2O$$

$$NH_2+OH\cdot \rightarrow NH_2OH$$

$$NH_2OH \rightarrow HNO \rightarrow NO \rightarrow N_2$$

or $$NH_3+OH\cdot \rightarrow NH_2OH+H^+$$

$$NH_2OH+OH\cdot \rightarrow NO_2^- \rightarrow NO_3^-$$

The first variant indicated above for the mechanism is more probable, as only comparatively small amounts of nitrite and nitrate ions are revealed in measurements. The ammonia molecules are therefore successfully oxidized to hydroxylamine, nitroxyl, nitrogen monoxide, and lastly reduced to give gaseous nitrogen.

In the case of irradiation with UV radiation at wavelengths below 280 nm, the decomposition of ammonia takes place in accordance with the following reaction:

$$NH_3 \rightarrow \cdot NH_2+H$$

For higher wavelengths below 311 nm, ammonia also decomposes in accordance with the following mechanism:

$$NH_3 \rightarrow \cdot NH+H_2$$

Imide radicals ($\cdot NH$) can react with ammonia to form hydrazine:

$$\cdot NH+NH_3 \rightarrow N_2H_4$$

Two imide radicals can combine to form nitrogen and hydrogen:

$$NH+\cdot NH \rightarrow N_2+2H$$

Two amino radicals can combine in turn to form hydrazine:

$$NH_2+\cdot NH_2 \rightarrow N_2H_4$$

Two hydrogen atoms form a hydrogen molecule, and so, as well as nitrogen, hydroxylamine and hydrazine, it would also be possible for gaseous hydrogen to be produced—however, in a mixture with an air stream more than 1000 times greater, this hydrogen poses no hazard and could be discharged with the offgas from the plant, or reacts with atmospheric oxygen to form water.

According to one preferred development of the present invention, the irradiation takes place by means of a UV lamp arrangement, comprising preferably at least one UV-LED lamp, which is arranged in spatial vicinity to at least one supply line via which a urea melt or a concentrated urea solution is passed to the fertilizer granulator.

Below, a general description is given of a fluidized bed granulator suitable, for example, for the application of the method of the invention. The purpose of this description is to facilitate understanding of the fluidized bed granulation. The description below of a fluidized bed granulator should not in any way, on the other hand, be interpreted so as to limit the scope of protection of the present invention. In the context of the invention, of course, fluidized bed granulators with different constructions can be used, and, equally, other techniques for producing the fertilizer granules within the context of the present invention can be contemplated. A typical fluidized bed granulator as may be used in the method of the invention for producing the urea-containing granules comprises at least one granulator interior having granulator interior walls. The granulator interior walls comprise at least one first granulator side wall (preferably as a long side of the fluidized bed granulator), a second granulator side wall (preferably as a long side of the fluidized bed granulator), a granulator front wall (preferably as a short side or narrow side) and a granulator rear wall (preferably as a short side or narrow side). Arranged within the granulator interior, preferably horizontally above the interior base, is a perforated plate. There are preferably spray-nozzles mounted in an arrangement in, above or on the perforated plate. The spray nozzles may alternatively also be arranged separately from the perforated plate—for example, above the perforated place or laterally in the granulator space (for example, on the granulator side walls). The spray nozzles are connected preferably to atomizing gas feed lines and melt supply lines for supplying the urea melt or concentrated urea solution. Arranged preferably in the region of these melt supply lines are the UV lamps for the photocatalytic decomposition of the ammonia, preferably in a region which is not too far ahead of the point of introduction into the granulator.

The aforementioned atomizing gas feed lines are gas feed lines which, together with the melt to be granulated from the melt supply lines, generate finely divided melt droplets ("atomized droplets") in the spray nozzles. In the sense of the invention, the expression "atomizing" does not refer to the dissociation or decomposition of the melt droplets into individual atoms, but rather to the generation of small melt droplets, preferably in the range of 1 to 200 µm. The expression "melt" in the sense of the invention encompasses concentrated solutions, suspensions, emulsions or dispersions, preferably with a fraction of the component for dissolution in the urea-containing melt of greater than 0.5 weight % to 50 weight %, more preferably less than 30 weight %.

A fluidized bed granulator additionally in general comprises one or more seed inlet apertures and one or more granule outlet apertures, with the section between the seed inlet aperture/s and the granule outlet aperture/s defining an (imaginary) granule flow direction. The expression "seed inlet aperture" describes one or more openings or feeds via which relatively small (smaller than the desired granule size) particles are introduced as seed particles (also referred to as seeds) into the fluidized bed granulator. Via the spray nozzles, the seed particles are subjected to melt droplets. As a result of this subjection, the seed particles undergo continuous "accretion". As a result of the accretion, the particles at a microscopic level preferably have a "raspberry like" appearance, consisting of a core with fused-on, solidified (crystalized) drops.

In a typical fluidized bed granulator, the granulator interior preferably comprises a fluidizing gas feed line, and also, arranged in or on the perforated plate, spray nozzles having feed lines for melt and feed lines for atomizing gas. The feed lines for melt and feed lines for atomizing gas may comprise individual or collective feed lines. The fluidizing gas feed line enables an air stream or gas stream to be introduced, which, from below, through the perforated plate, generates a fluidized bed of granule particles above the perforated plate.

The urea melt or concentrated urea solution used in the method of the invention may comprise further substances such as, for example, ammonium sulfate, elemental sulfur, ammonium nitrate, trace elements, granulating additives, emulsifying additives and/or mixtures thereof. The systems employed, accordingly, are pure urea melts or urea solutions, or pure urea melts or urea solutions with a granulating additive such as, for example, formaldehyde, polyvinylamines, polyethylene vinyls (e.g. polythyleneamine), polyethyleneimines, carboxylic acids and/or aldehydes.

A further subject of the present invention is an apparatus for producing fertilizer particles which comprise urea and/or at least one ammonium compound, more particularly fertilizer granules, preferably by the method described above, comprising a plant section having a working space, in particular a fertilizer granulator, in which the fertilizer particles are produced, and at least one supply line to the plant section, by means of which a urea melt or a concentrated urea solution is passed to the plant section, where, in accordance with the invention, at least one UV lamp arrangement is arranged in spatial vicinity to at least one supply line, by means of which the urea melt or concentrated urea solution flowing in the supply line is irradiated with UV radiation.

In one preferred development of the invention, the UV lamp arrangement comprises at least one UV-LED lamp. Suitable UV-LED lamps are available on the market and are notable through a compact construction and comparatively low energy consumption, allowing them to be used effectively and inexpensively in the method of the invention.

The supply line, at least in the region in which the UV lamp arrangement is positioned, is preferably configured to be transmissive for UV radiation. The UV radiation is therefore able to pass through the walls of the line into the interior of the line, and decompose the ammonia contained in the urea melt or concentrated urea solution flowing in the line. The term "transmissive" in this context should be understood to mean that the UV radiation emitted by the UV lamp is absorbed or scattered not at all or only to an extremely small extent, thus achieving a high efficiency.

In construction terms, this can be achieved, for example, by giving the supply line a UV radiation-transmissive window in the region in which the UV lamp arrangement is positioned. At least in this region of the window, therefore, the line consists of a material which is transmissive for the UV radiation to a sufficient extent, so that the walls of the line absorb no radiation or only a small fraction of the radiation, and the substantial fraction of the radiation passes through the line walls into the line interior.

As a window transmissive for UV radiation, it would be possible, for example, to use industry-standard "sight glasses". These serve in general for visual monitoring of flow transit. These sight glasses can be provided on both sides with pressure-resistant and corrosion-resistant glasses, with a UV lamp being arranged on one side. In this application, the glass in the region opposite the UV lamp could preferably be mirrored, to reflect the UV radiation. The radiation intensity increases a result.

Reference is made below to FIG. 1. The representation is highly schematically simplified, and represents only those functional structural units of the fertilizer granule production plant that are important in the context of the method of the invention. The plant comprises a granulator 10, which in the exemplary embodiment is a fluidized bed granulator. The fundamental construction of a fluidized bed granulator 10 of this kind has already been elucidated above and, moreover, is known per se from the prior art, and so this construction is not described more closely in detail once again here. The granulator 10 here is represented schematically as a plant section having a working space in which the fluidized bed granulation takes place. To generate a fluidized bed, the plant comprises a first supply line 11 for fluidizing air to the granulator 10. Arranged in this line 11 is a first blower 12, which conveys the fluidizing air to the granulator 10.

The plant further comprises a second supply line 13 for atomizing air to the granulator, and in this line as well there is a fan 14 disposed, which conveys the atomizing air to the granulator. The purpose of the atomizing air is to supply the spray nozzles (not represented here) with air by means of which the melt is finely atomized and sprayed into the granulator. A heat exchanger 15 may optionally be provided in this line 13 in order to preheat the atomizing air.

Additionally provided is a third supply line 16 for urea melt or concentrated urea solution to the generator 10, and a pump 17 is provided in this third supply line 16 to convey the urea melt or concentrated urea solution to the granulator 10. In the spray nozzles, not represented here, the urea melt or urea solution is mixed with the atomizing air, atomized to form fine spray droplets, and sprayed into the granulator. As a result of this spraying procedure, the urea melt or concentrated urea solution comes into contact with the granulation seeds, and accretion produces the granule particles, as already elucidated above, which are then discharged for further treatment via at least one granule discharge aperture, represented here only schematically, by way of the line 18 in the arrow direction out of the granulator 10. The offgas departs the granulator 10 in the upper region via the offgas line 19, which then leads in general to an offgas scrubber 20, in which the offgas is cleaned. In the case of dust scrubbing of the offgas, a dust-containing scrubbing solution is formed, which contains urea and can be taken off from the offgas scrubber 20 by means of a pump 22. This urea-containing scrubbing solution may subsequently be concentrated by evaporation and passed back as concentrated urea solution to the process for producing urea particles and for this purpose, for example, as indicated by the arrow 21, it can be fed into the supply line 16 which leads to the granulator 10.

For the production of fertilizer granules, the granulator 10 may be supplied not only with the urea melt or concentrated urea solution but also with further constituents such as formaldehyde, for example. In that case use is frequently made, for example, of a solution of formaldehyde (e.g., 60%), urea (25%) and water (15%) (also designated UFC 85), which can be admixed to the urea melt or concentrated urea solution via the line 23, which opens out into the line 16, after which this united mixture can be supplied to the granulator 10. The admixing of a formaldehyde-containing UFC solution of this kind is stated here only illustratively, in order to emphasize that the urea granules may contain a wide variety of constituents additional to urea. Accordingly, in the context of the present method, the admixing of formaldehyde or UFC should by no means be regarded as necessary to the invention, instead having only an elucidating, illustrative character at this point.

In accordance with the present invention, at least one UV-LED lamp 24 is arranged next to the supply line 16 which supplies the urea melt or concentrated urea solution to the granulator 10, and this UV-LED lamp 24 emits UV radiation which decomposes the ammonia dissolved in the urea melt or concentrated urea solution. This UV-LED lamp 24, as can be inferred from the representation in FIG. 1, is arranged next to the supply line 16 in spatial vicinity to the granulator 10, upstream of the granulator, shortly before the urea melt or concentrated urea solution is sprayed into the granulator 10. The effect of this is that ammonia which forms in the course of production and storage and also, possibly, in the conveying pathway taken by the urea melt to the granulator, is decomposed before the ammonia enters the granulator, and so can no longer be released in the fluidized bed granulation process within said granulator. This also prevents the ammonia reaching the offgas which is taken off from the granulator 10 via the offgas line 19. A further effect of this is that the reaction to form biuret is not promoted. By destruction of the NH$_3$, the reaction equilibrium shifts in the direction of biuret, and so the premature removal of ammonia would cause more biuret to form. The UV lamps are preferably mounted not on the main line but instead at the feeds to the individual melt nozzles.

In practice, the urea solution ought to be divided between numerous nozzles (up to 400, for example). From the main line represented in FIG. 1, accordingly, there are individual lines to the nozzles. The nozzles are in turn arranged in groups (up to 18, for example). Each nozzle group has a dedicated feed line. There is therefore a further possibility for mounting the UV lamp(s) on the individual nozzle feed lines. This has the further advantage that the lamps can be physically mounted directly on the granulator.

The performance of the plant is regulated by the taking of the individual nozzle groups into operation. Hence the UV lamps also need only be taken into operation if that nozzle group is being utilized. This enables an energy saving and also longer durability of the UV lamps.

Figure 2:
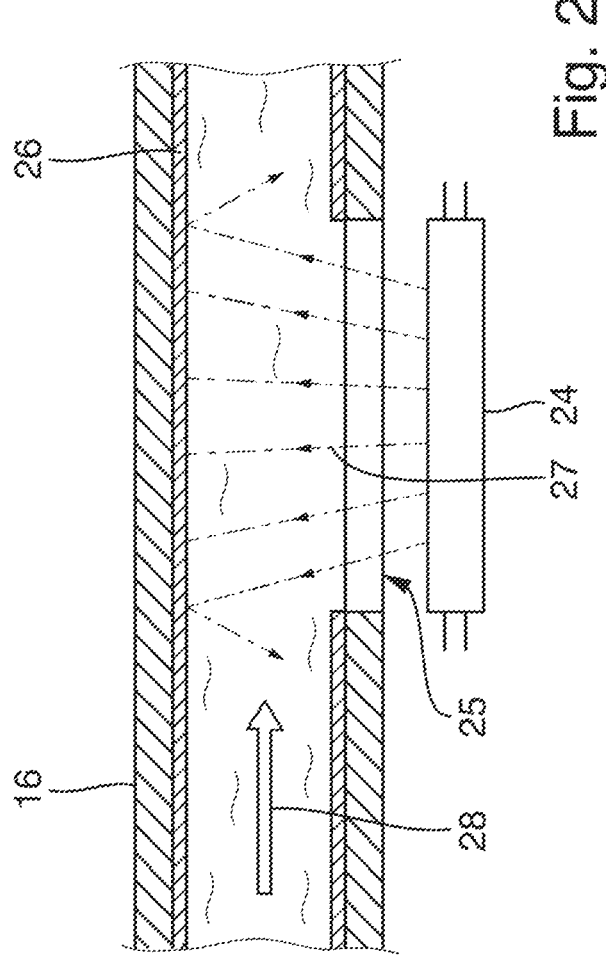
FIG. 2 is a schematic, enlarged detail view of a supply line for urea melt in a region of a UV lamp, in partial longitudinal section.

Reference is made below to FIG. 2, which shows a schematic, enlarged detail view of the supply line 16 for urea melt in the region of the UV lamp 24, in a partial longitudinal section. A urea melt is transported to the granulator through the supply line 16 in the direction of the arrow 28. The supply line 16 has a window 25 which is transmissive for UV radiation 27, and the UV radiation 27 emitted by the UV lamp 24 is irradiated through this window into the inside of the supply line 16. The supply line 16 is preferably coated on the inside with a reflective layer 26 which reflects the irradiated UV radiation 27, and so the UV radiation impinging on this reflective layer is reflected there, thereby intensifying the UV radiation in the supply line 16. The UV radiation 27 causes photocatalytic decomposition of the ammonia contained in the urea melt.

LIST OF REFERENCE SYMBOLS

10 Granulator, fertilizer granulator
11 Supply line for fluidizing air
12 Fan for fluidizing air
13 Supply line for atomizing air
14 Fan for atomizing air
15 Heat exchanger
16 Supply line for urea melt
17 Pump
18 Line for discharging the granules
19 Offgas line
20 Offgas scrubber
21 Arrow
22 Pump
23 Line for UFC
24 UV Lamp
25 Window
26 Reflective layer
27 UV radiation
28 Arrow

What is claimed is:
1. A method for producing a fertilizer that comprises at least one of urea or an ammonium compound, the method comprising:

obtaining ammonia as an impurity in the production of the fertilizer; and decomposing the ammonia, as it is bound or dissolved in a urea melt or in a concentrated urea solution, photocatalytically by irradiation with UV radiation;

wherein decomposing the ammonia photocatalytically includes irradiating the urea melt or the concentrated urea solution with UV radiation on a transport path to a fertilizer granulator.

2. The method of claim 1 comprising producing fertilizer granules in a granulation process.

3. The method of claim 1 comprising producing urea-containing fertilizer granules in a granulation process.

4. The method of claim 3 comprising producing the urea-containing fertilizer granules by fluidized bed granulation.

5. The method of claim 1 wherein the urea melt or the concentrated urea solution is irradiated with UV radiation at a low spatial and/or temporal distance or immediately prior to addition to the fertilizer granulator.

6. The method of claim 1 wherein the UV radiation has a wavelength in a range from 170 nm to 350 nm.

7. The method of claim 1 wherein the UV radiation has a wavelength in a range from 185 nm to 254 nm.

8. The method of claim 1 comprising photocatalytically decomposing the ammonia predominantly into nitrogen and water.

9. The method of claim 1 wherein the irradiation occurs by way of a UV lamp arrangement disposed proximate a supply line via which the urea melt or the concentrated urea solution is passed to a fertilizer granulator.

10. A method for producing a fertilizer that comprises at least one of urea or an ammonium compound, the method comprising:

obtaining ammonia as an impurity in the production of the fertilizer; and decomposing the ammonia, as it is bound or dissolved in a urea melt or in a concentrated urea solution, photocatalytically by irradiation with UV radiation;

wherein the irradiation occurs by way of a UV lamp arrangement disposed proximate a supply line via which the urea melt or the concentrated urea solution is passed to a fertilizer granulator.

* * * * *